United States Patent
Bauer (10) Patent No.: US 6,270,669 B1
(45) Date of Patent: Aug. 7, 2001

(54) ROTARY SELF-CLEANING DRUM STRAINER

(76) Inventor: Tod Anthony Bauer, P.O. Box 871502, Wasilla, AK (US) 99687

( * ) Notice: Subject to any disclaimer, the term of this patent is extended or adjusted under 35 U.S.C. 154(b) by 0 days.

(21) Appl. No.: 09/437,770

(22) Filed: Nov. 9, 1999

(51) Int. Cl.[7] .................................................. B01D 33/46
(52) U.S. Cl. ...................... 210/237; 210/242.1; 210/396; 210/402
(58) Field of Search .................................... 210/157, 158, 210/161, 237, 242.1, 391, 396, 402, 407

(56) References Cited

U.S. PATENT DOCUMENTS

| | | | | |
|---|---|---|---|---|
| 658,196 | * | 9/1900 | Whitney | 210/396 |
| 793,720 | * | 4/1905 | Godbe | 210/396 |
| 3,347,379 | * | 10/1967 | Miller | 210/391 |
| 4,017,394 | * | 4/1977 | Hensley | 210/242.1 |
| 5,052,855 | * | 10/1991 | Chapman et al. | 210/242.1 |

* cited by examiner

*Primary Examiner*—Matthew O. Savage
(74) *Attorney, Agent, or Firm*—Michael J. Tavella (57) ABSTRACT

A rotating brush, mounted on either the outside or the inside of a rotary intake drum, to brush debris from the surface of the drum. The debris is collected in a holding bin located under the brush. The system uses a collector to remove debris from the holding bin when it is filled. In this way, debris is removed completely from the intake, rather than merely brushing it from the drum into the water flow, where it is immediately sucked onto the drum again. The brush rotates the drum as it turns on the surface. This action flicks the debris from the drum into the holding bin. This action automatically removes debris as the drum is working. Other features of the device include a framework for placing and operating the drum and the collection system.

18 Claims, 6 Drawing Sheets

ROTARY SELF-CLEANING DRUM STRAINER

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to rotary drum strainers and particularly to rotary drum strainers that are self-cleaning.

2. Description of Related Art

Strainers are used in association with motor-driven pumps that suck water out of outdoor pits, reservoirs, streams, ponds, and the like, for mining, irrigation, or watering purposes. Typically, strainers are connected to pumps by a long intake conduit or hose that extends from the strainer in the body of water to a pump on land. Strainers are placed on the end of the intake to prevent debris, small stones and other objects from being sucked into the pump while pumping. As a pump is operated, the strainer may be covered with leaves and other large pieces of debris that are drawn to the strainer. This material eventually blocks the strainer openings, thereby reducing the flow of water through the strainer, possibly even shutting it off entirely. Once plugged, the strainer must be removed from the water and cleaned. During this time, no water can be pumped. Depending on the water source, this cleaning operation can be frequently required, making the pumping operation inefficient.

To overcome this problem, self-cleaning strainers have been developed. For example, U.S. Pat. Nos. 5,275,656, 5,108,592, and 4,822,486 use water fed from the pressure side of the pump to rotate and clean the screen. This water washes debris from the screen while the pump is in operation. However, the volume of water delivered to a pump is reduced using this method because some water is redirected to the strainer. Moreover, this method of cleaning and rotating the screen depends on pump pressure being high enough to effectively clean and rotate the screen. Finally, although the devices clean the strainer, the debris removed from the strainer remains in the body of water near the strainer. This debris is then pulled right back onto the strainer where it must be washed off again. Thus, this method is not efficient.

U.S. Pat. No. 4,261,822 illustrates a drum-like screen that is placed horizontally in a ditch and held partially out of the water by attached legs. It is designed to be transportable. However, it is designed to be used primarily in only irrigation ditches. Although this device is an improvement over the others, it benefits from two advantages of controlled operating circumstances. First, because it is intended for use in irrigation ditches, the movement of water can be controlled. Second, the water level can be controlled. Thus, the strainer may rest on the ditch floor and does not have to be raised or lowered with changes in water level. These conditions are not often found in many bodies of water.

BRIEF SUMMARY OF THE INVENTION

The instant invention overcomes the problems and limitations of the previously mentioned devices. It is an object of this invention to provide a rugged, self-cleaning rotary intake filter that can be transported and quickly set up for adverse conditions in a variety of water bodies.

It is another object of the invention to provide a simple, effective and efficient way of rotating and cleaning the screen.

It is yet another object of the invention to provide a means to carry the screen during transport, and to place the screen for operation.

It is yet another object of the invention to provide a means whereby the invention can be suspended from a lifting source such as a boom extending from the pump frame.

It is a further object of the invention to provide a means for flotation whereas the invention floats at the correct level in the water for efficient operation in different depths of water.

It is yet a further object of the invention to provide a means for containment of debris being cleaned off the screen It is a further object of the invention to provide a means for supporting the invention so that the device may be placed on the floor of the water body if so desired.

With these objects in mind, the invention is a rotary water intake drum that has a self-cleaning system attached. This system uses a rotating brush, mounted on the outside of a drum, to brush debris from the surface of the drum. The debris is collected in a holding bin located under the brush. The system uses a collector to remove debris from the holding bin when it is filled. In this way, debris is removed completely from the intake, rather than merely brushing it from the drum into the water flow, where it is immediately sucked onto the drum again. As the brush rotates, the drum rotates. As the drum rotates, the flexible bristles on the brush flick the debris from the screen on the drum into the holding bin. This action automatically removes debris as the drum is working. Other features of the invention include a framework for placing and operating the drum and the collection system. Moreover, this system is designed for use in different types of water and at different depths.

DETAILED DESCRIPTION OF THE INVENTION

Figure 1:
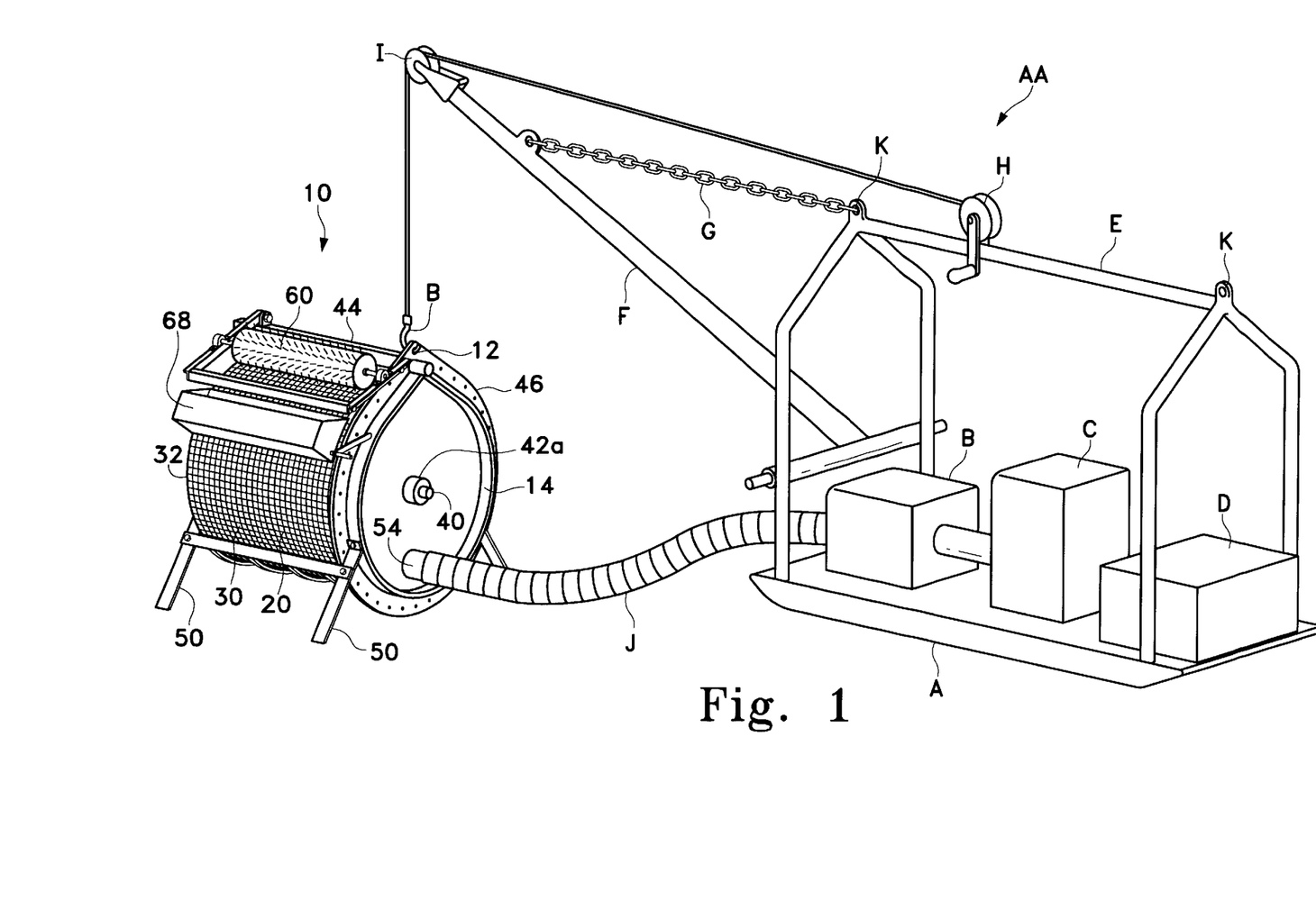
FIG. 1 is a perspective view of the invention and the auxiliary lifting and operating station.

Referring now to FIG. 1, the preferred embodiment of rotary self-cleaning drum strainer 10 is shown. FIG. 1 also shows a system from which strainer 10 may be suspended. The system AA has a skid A, from which a pump B, an engine C and a fuel tank D are mounted. Upper framework E provides a place for boom F to be mounted. A chain G provides support and holds adjustable boom F at the correct angle for operation. A winch H is provided on upper framework E and its cable extends over boom pulley I and to a lifting eye 12 of strainer 10. A flexible conduit J allows strainer 10 to be raised or lowered independently of the system AA.

The weight of the skid A, pump B, engine C, fuel tank D, and upper framework E, is more than sufficient to suspend strainer 10, from boom F. Picking eyes K are provided on top of upper framework E in order to lift entire system AA along with screen drum 10 to a desired location. A piece of equipment such as a loader or an excavator is normally used for this procedure. System AA is placed so that skid A is on solid ground and strainer 10 is hanging over a body of water. Winch H is operated to lower strainer 10 to the correct level in the liquid.

Figure 2:
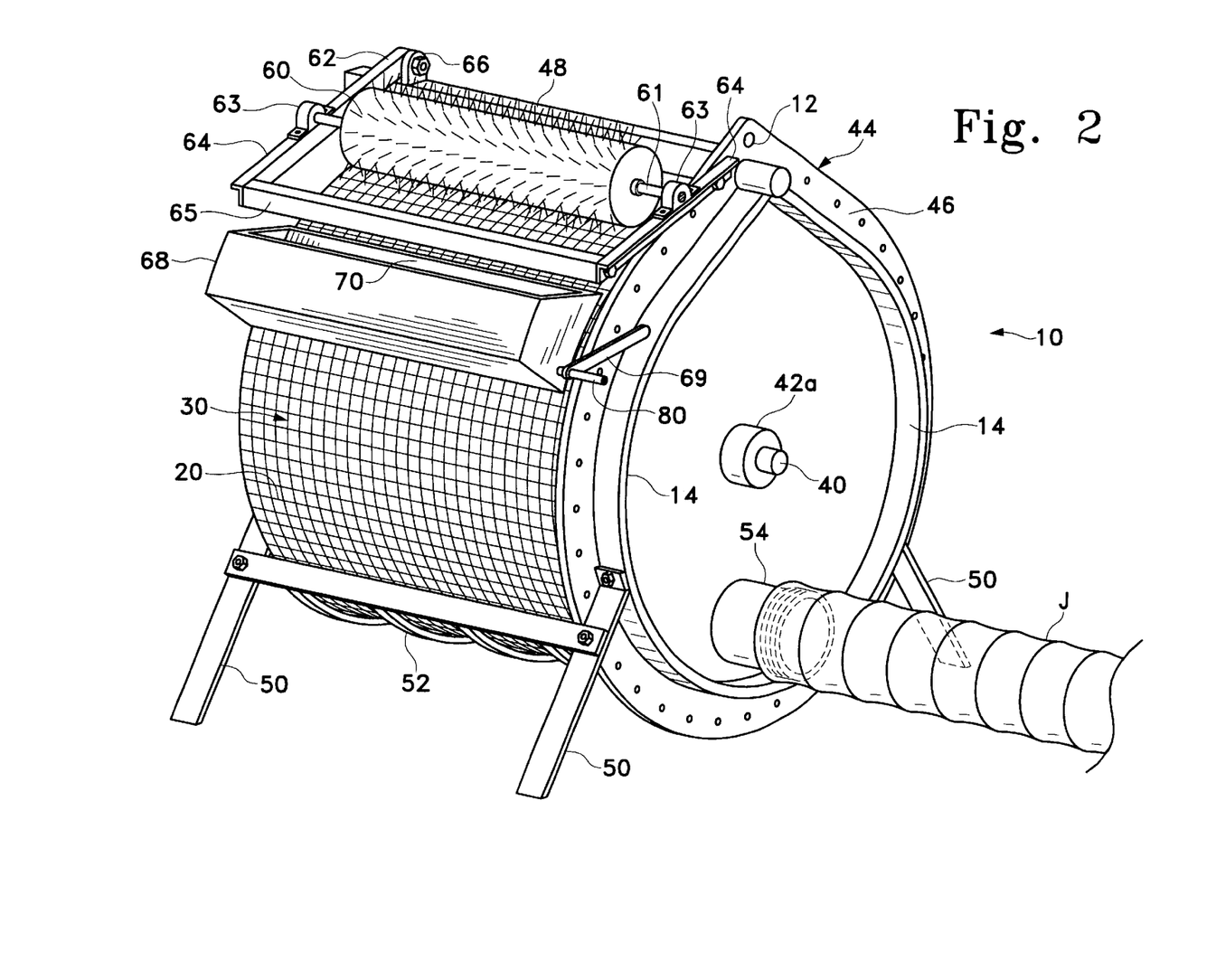
FIG. 2 is a perspective view of the invention.
Figure 3:
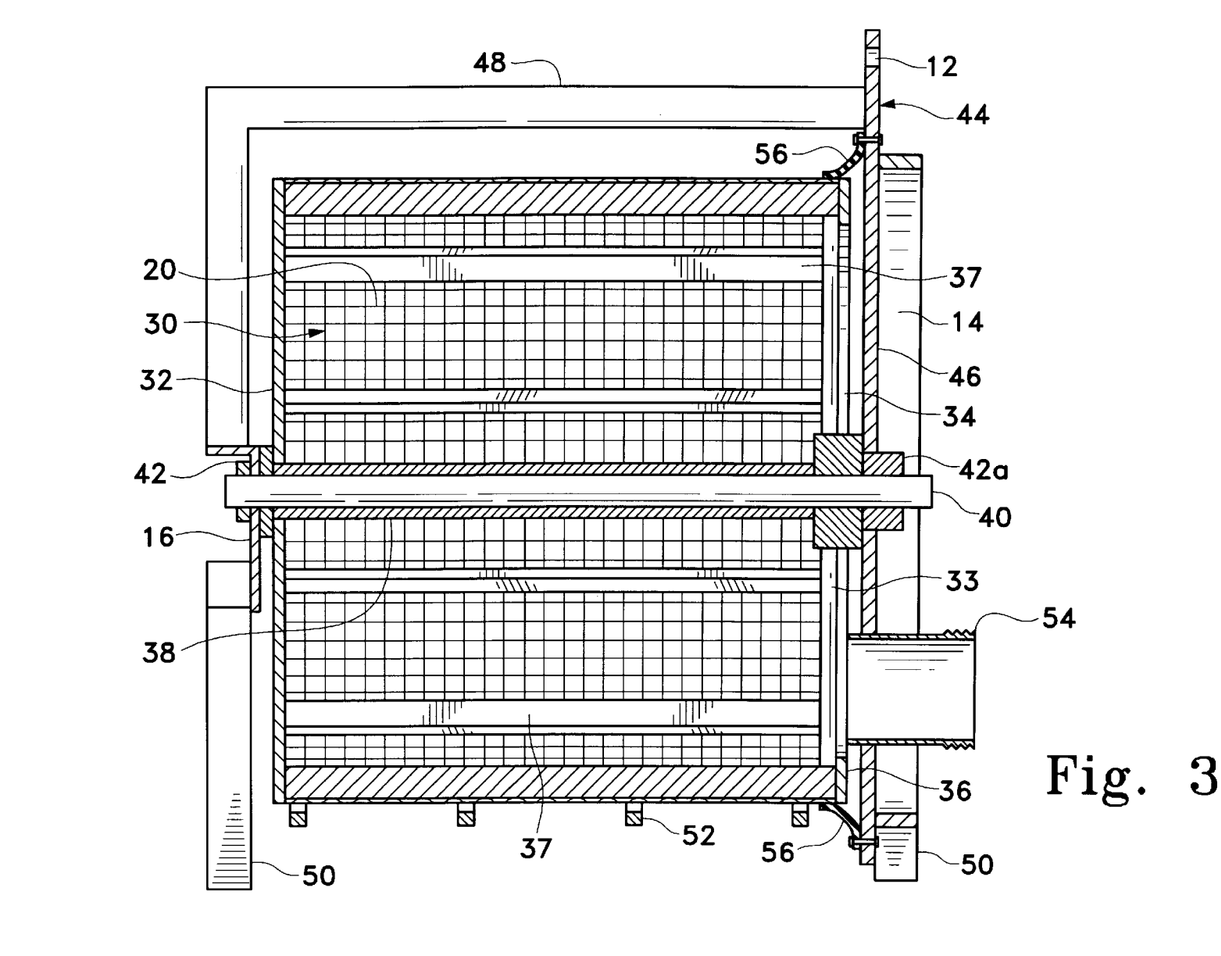
FIG. 3 is a side cut-away view of the invention.

The FIGS. 1, 2, and 3, show the rotary self-cleaning drum strainer 10 that includes a main frame 44 upon which all other components of the strainer 10, are mounted. A fixed plate 46, legs 50, and screen guard 52, make up the rest of the main frame 44. The fixed plate 46 is made generally of flat plate material and in the preferred embodiment is made of 3/16-inch thick, flat steel plate. A hole is disposed in the lower portion of plate 46. A threaded pipe adapter 54 is welded to the perimeter of the hole. The threaded adapter 54 makes a fluid connection from the inside of a screen drum 30, described later, to conduit J. Conduit J makes fluid connection to the intake of the liquid pump B. In most cases, a foot valve (not shown) is placed in the line between the threaded adapter 54 and conduit J. The foot valve keeps the liquid pump from losing its "prime" when not in use. The pipe threads of adapter 54 allow for common connections. Fixed plate 46 is generally circular in shape except at the top, where the plate extends above the circular diameter. This extension has a hole in it that serves as a picking eye 12, from which strainer 10 may be suspended as described above. In the preferred embodiment, fixed plate 46 has support members 14 of suitable size welded to it in order to make the plate rigid.

In the center of the circular shaped fixed plate 46 is a mounting hole from which a bearing thrust plate 42a is attached. A frame arm 48 is welded at one end to the top of the circular shape of plate 46 and below the picking eye 12. Frame arm 48 extends away and perpendicular from plate 46, along the top of the drum 30. At the end of the drum 30, the frame arm 48 forms a 90-degree angle. The frame arm 48 then runs parallel with plate 32 until it reaches the point where it is in axial agreement with bearing 42a in fixed plate 46. At this point, a mounting plate 16 is welded to the frame arm 48 where a mounting hole is formed to accept bearing thrust plate 42. See FIG. 3.

The cylindrically shaped screen drum 30 is mounted horizontally between bushings 42 and 42a by a central support tube 38, as shown in FIG. 3. A central shaft 40 is installed in the support tube 38. The shaft 40 passes through bushings 42 and 42a as shown. Screen drum 30 has an end plate 32 to cap one end of the horizontal screen and an open end hub 34 at the opposite end of drum 30 which faces fixed plate 46. See FIG. 3. The tube 38 extends slightly through the center of cap 32. It is welded to cap 32 for support. Tube 38 is supported at the open end of drum 30 by a plurality of outwardly extending radial arms 33, which connect, to a ring member 36. The ring member 36 in the preferred embodiment is made of 1/4-inch thick steel plate, being 48 inches outside, and 44 inch inside diameter. Open hub 34 having arms 33 extending from its center to ring member 36 is left open to allow liquid coming through the wall of drum 30 to enter threaded pipe adapter 54 which is connected to the pump B by the conduit J. Ring member 36 and end cap 32 are interconnected by a plurality of screen supports 37. Together screen supports 37 and ring member 36 make up a cylindrically structured cage from which a screen element 20 is mounted. Screen supports 37 are generally made up of steel flat-bar of appropriate size. The flat bar is welded so that its thickness is facing the screen 20 to blind the least amount of screen and yet be structurally strong to support the screen 20. The screen 20 may be formed by rolling a rectangular section of appropriate size into a circular shape; clamping the screen 20 against the hubs and screen supports; and then tack welding the screen to the hubs and screen supports. If desired, an angle iron may replace a flat-bar screen support to give extra area to tack weld the abutting screen edges at the screen joint.

Screen drum 30 is spaced a distance apart from the fixed plate 46 by thrust plate bearings 42 and 42a. A seal 56 is provided to prevent debris from entering the drum 30 through this space. This debris can hinder the rotation of the drum 30. It can also be sucked into pump B. The seal 56 is made of suitable material such as rubber. The fixed plate 46 is larger in diameter than the drum 30 to allow for the seal 56 to be bolted to the outer portion of the fixed plate 46. The length of the seal 56 encircles the complete diameter of the drum 30, therefore effectively sealing the space described above.

The screen element 20 is made of heavy gauge wire to be self-supporting between screen supports 37. The specific details of the screen, such as screen thickness and the size of the holes depends on the particular size of strainer 10, and the particular intended use for which the strainer 10 is designed. An example of preferred material for screen 20 is a mesh with approximately 4 to 6 meshes per inch and approximately 11-gauge wire.

A cylindrically shaped brush 60 is mounted to be in mesh with and parallel to screen drum 30. Brush 60 has a centrally disposed shaft 61 extending further on each end then the brush. A pillow block bearing 63 placed at each end of shaft 61 provides a rotatable mounting for brush 60 to a brush frame 62. Shaft 61 extends through and beyond pillow block bearing 63 at the front end of the strainer 10 (at plate 46). The shaft 61 has slot in it to accept a key for a drive unit, which can be placed on shaft 61. Drive units are described in detail below.

Brush frame 62 has two extension arms 64 and a cross member 65. Cross member 65 is welded between the extension arms 64 to make a rigid U-shaped frame, as shown. The pillow block bearings 63 that support the brush 60 are attached to the extension arms 64 by bolts. Brush 60 is mounted to keep brush bristles from making contact with cross member 65. The extension arms 64 are attached to the strainer by bolts. The forward extension arm bolts to a mounting hole in fixed plate 46 and the rear extension arm bolts to a tab 66 located on frame arm 48. See FIG. 2.

A washer is placed between each extension arm and its respective mounting hole to serve as a spacer, allowing free movement of brush frame 62. A lock nut is provided on each bolt in order to snug but not tighten the bolt to allow free movement of frame 62.

The brush 60 is of the long, moderately stiff, bristle type. The brush 60 is slightly shorter than the drum 30 to keep the bristles from damaging the rubber seal, 56.

A catch hopper 68 is located parallel to and just below the brush 60. The catch hopper 68 is a generally trapezoidal box, being wider at its front edge, where debris is received from the brush 60 than its back. The hopper 68 is approximately as deep as the diameter of the brush 60. The end plates of the hopper each have a shaft 80 welded to them. In the preferred embodiment, these shafts are close to the back plate and approximately in the middle of the width of the end plates. These shafts 80 act as a pivot point for mounting the hopper 68 to the frame. Two hopper support arms 69 are welded to the main frame 44. Each support arm has a slot in which the shafts 80 are attached. The shaft at the fixed plate 46 side extends past the mounting arm 69 and has a slot in it to accept a key so a flexible coupler such as a u-joint can be attached. See FIG. 6.

Four legs 50 are attached to the main frame 44 as shown. The legs 50 are attached using conventional means, such as bolts or welding. The front legs are attached to the bottom of fixed plate 46. The two rear legs are attached to the frame arm 48. See, e.g., FIG. 4. The legs are support the strainer 10 and allow it to rest on the water body floor while maintaining enough space between the drum and the floor to allow the drum 30 to turn freely.

A screen guard 52 is attached to legs 50 by bolts. Screen guard 52 has two side frame pieces extending from a fixed plate leg to a frame arm leg and being bolted to each. Four cross members are extended to, and are welded to side frames. Cross members can be made from half inch reenforcing bar (rebar) or similar material. Side frames can be made from angle iron.

The preferred embodiment uses a screen that has an approximately 30 inch axial dimension and a diameter of approximately 48 inches. The threaded pipe adapter is approximately 8 inches in diameter.

It is understood that when the assembly of parts are described as welded that they may also be made to bolt together for shipping or manufacturing reasons.

Figure 4:
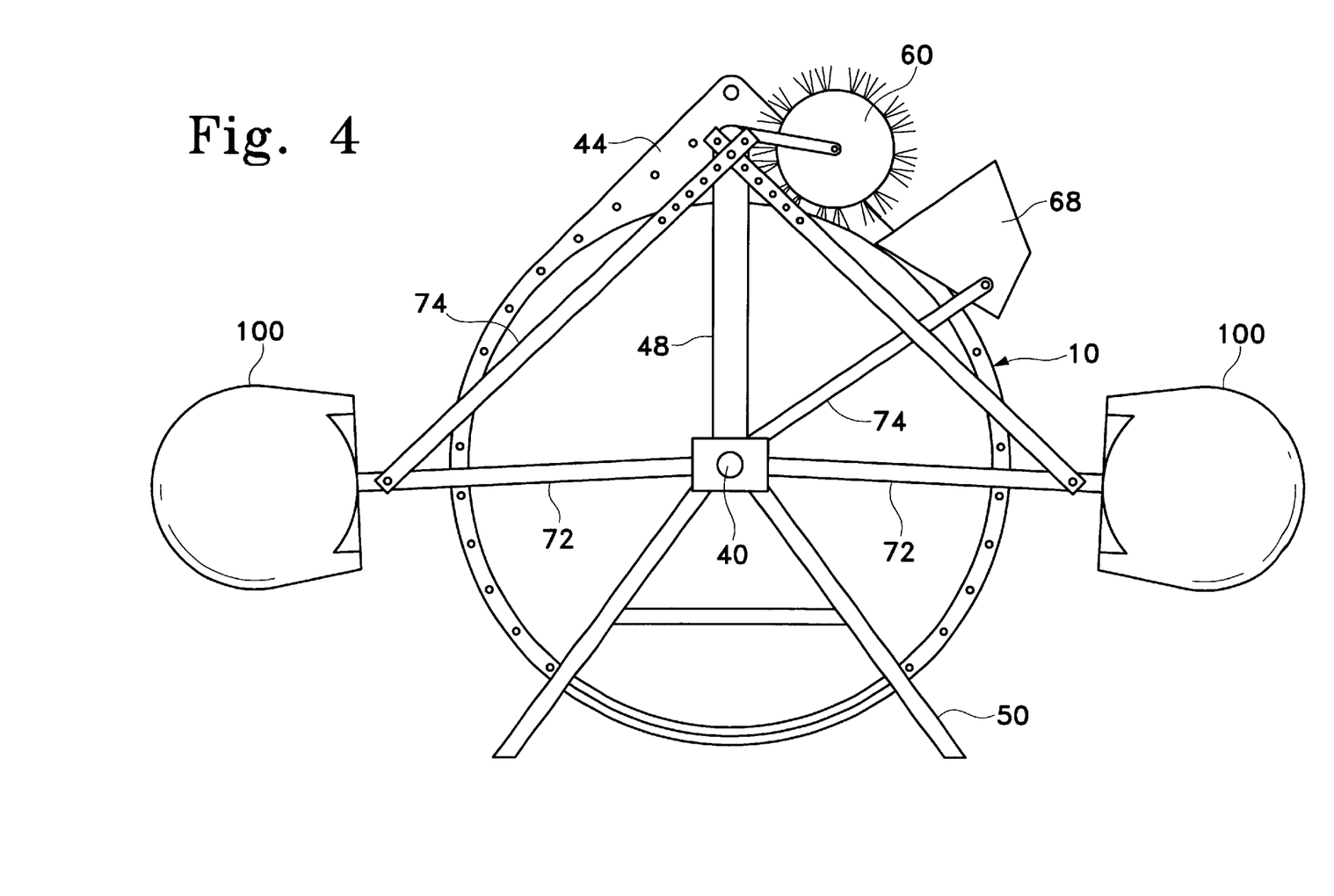
FIG. 4 is a front view of the invention, showing two floats installed.
Figure 5:
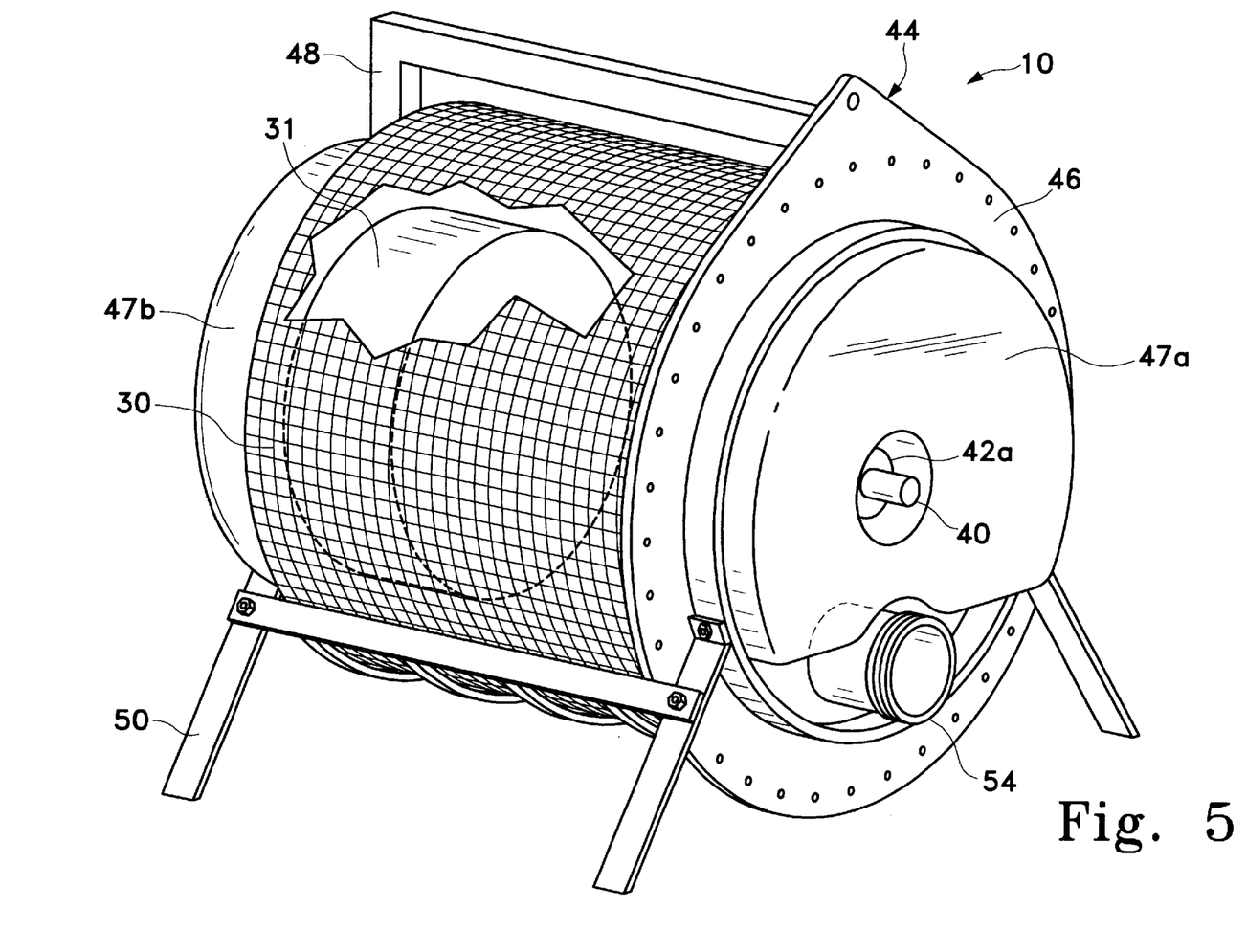
FIG. 5 is a partial cut-away perspective view of the invention with attached floats.

A flotation device can be used to adjust the level of the strainer 10 in one of several ways. Flotation can be installed either internally or externally or in a combination of both. Referring now to FIG. 5, an internal flotation body 31 is built inside of rotating drum 30. The flotation body 31 is a cylindrical shaped body, smaller in diameter and shorter in length than drum 30, so as not to interfere with water flowing through screen and into inlet conduit. The internal flotation body 31 can be built of a sufficient size to float entire invention 10. It can also be built of a sufficient size to only float rotating drum 30, thereby relieving the weight of the drum 30 on bearings, 42 and 42a. Main frame 44 also may have flotation bodies 47a and 47b formed into the fixed plate 46, and on frame arm 48 and frame arm legs 50 respectively. Built in body 47a on fixed plate 46 is of sufficient size and located in a manner to float the weight of fixed plate and its immediate adjoining parts. The built in body 47b, attached to the frame arm 48 and frame arm legs 50, is of a sufficient size to float its end of strainer 10. All three bodies together float invention 10 approximately one-half out of the water, while inlet conduit J is sufficiently submerged below water. Flotation cavities are also matched in size to put a slight tilt on strainer 10 whereas floatation body 47b is slightly more submerged than the fixed plate end. The reason for this is that generally a foot valve is attached to adapter 54. A foot valve works best when at an angle to allow the weight of the flapper to close the valve thereby keeping a prime in the pump. Other flotation methods are shown in FIG. 4, where sealed containers are attached to an adjustable framework. The framework has two U-shaped frames 72 one mounted on each side of strainer 10. They are attached to the central shaft 40, Which passes through holes disposed at each end of U-shaped framework. The U-shaped arms have a peg disposed on each outer corner from which a stiff arm 74 is attached. Stiff arms 74 are kept on the pegs by pins or similar fasteners. A plurality of holes is placed at the opposite end of the stiff arms 74. The length of the arms 74 can be adjusted by choosing a different hole to attach the arms 74 to the fixed plate 46 and frame arm 48.

From the outside of the U frame, a flotation device can be attached in a number of ways. For example, floats can be welded to the U-frame that fits sealed flotation containers. Floats 100 can be strapped, tied, wired, welded, or other way to the U-frame of the proper size to float strainer 10. The submersion depth of strainer 10 can be changed by adjusting stiff arms 74. Floats can be common containers such as 55 gallon drums, buoys, fabricated containers, foam-filled containers, and ridged foam just to name a few. The size of the flotation devices depends on the size and weight of the strainer 10 and the expense of manufacturing. The strainer 10 can be manufactured and sold with or without flotation devices attached. Any of the above-mentioned flotation attachments can be sold and manufactured separately as an attachment to the strainer as well.

Operation 1

Figure 6:
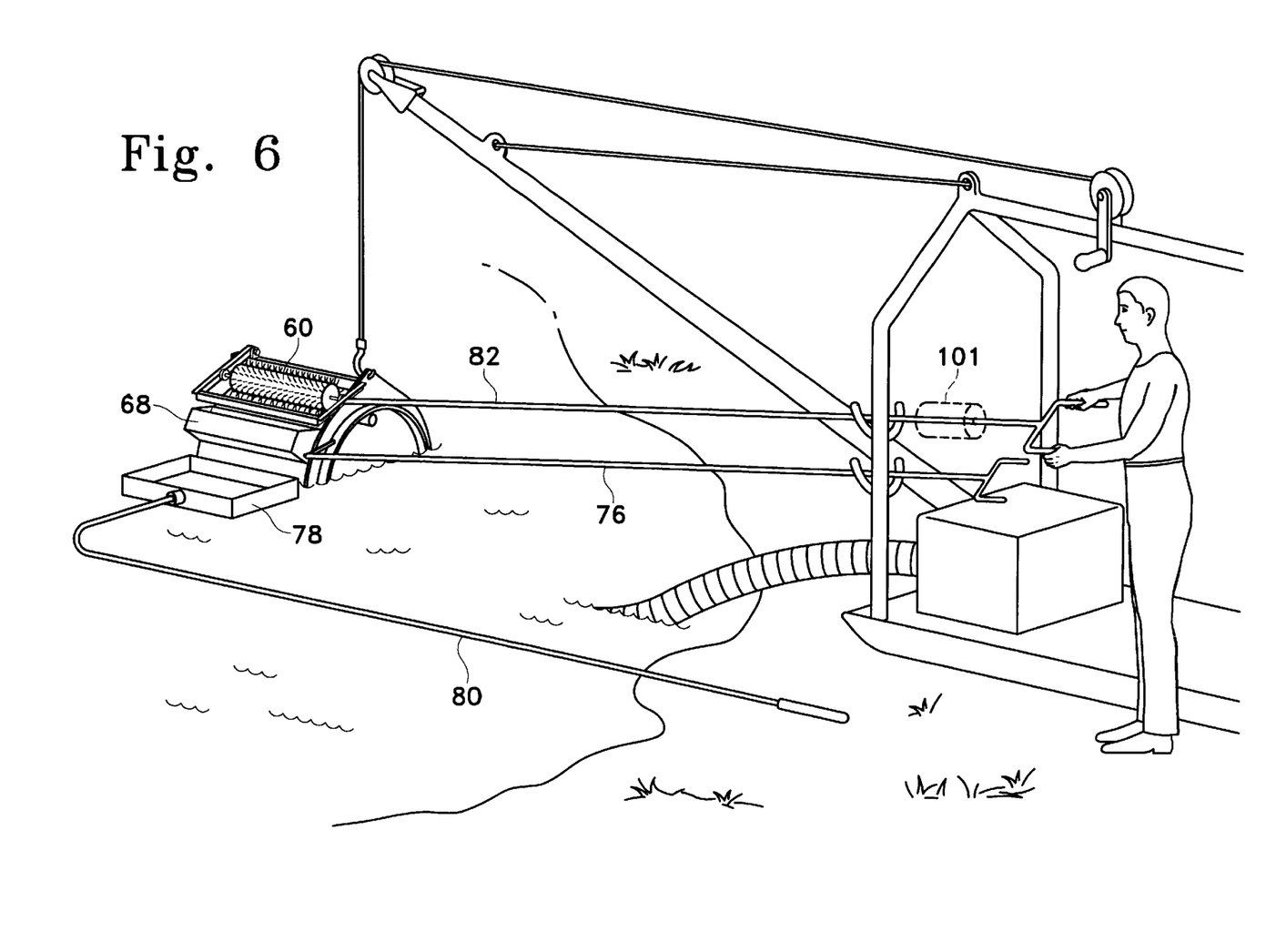
FIG. 6 is a perspective view of the device showing an embodiment that uses manual control of the cleaning elements.

The operation of the preferred embodiment is now described with reference to figures 1 and 6. When the strainer 10 is placed on the water body floor on its legs 50 approximately ½ to ⅓ of the screen drum 30 is above the water. This allows for threaded pipe adapter 54 to be well submerged since it is mounted on the lower portion of plate 46, while the brush 60 and hopper 68 are above the water line. The brush 60 is of a long, moderately stiff, bristle type. When the brush 60 is rotated and the bristles come in contact with the screen drum 30 they bend backward from the turning force and the weight of the brush 60 and frame 62.

The pressure and rotating force applied by the bristles in turn rotates screen drum 30. As the bristles come off the drum 30, they flex back into their normal straight position. If the bristles contact any debris adhered to the drum 30 they "flick" debris that was adhered to the drum 30 into the hopper 68 as they flex back into their normal position. When hopper 68 becomes full, the debris may be either manually removed. The hopper may be also dumped from shore by a dumping handle 76 extension from the shaft of the hopper described above. See FIG. 6. A flexible coupling such as a U joint is connected to the hopper shaft to dump handle 76. A floating hopper 78 may be positioned under the hopper 68 by an extending handle 80 from the shore. Hopper 68 may then be dumped into floating hopper 78. After hopper 68 has been dumped, it is rotated back into its operation position, floating hopper 78 is pulled to shore, and debris is disposed of. This ensures that the debris is removed from the water, which reduces the need to empty the hopper.

Operation 2

A system such as system AA described above may be used to suspend strainer 10 at the level desired in case of changing liquid levels. In this system, the simplest form of rotating the brush is by attaching a flexible joint such as a U-joint to the keyed shaft 61. From the opposite side of the U-joint, a shaft 82 is employed. The shaft 82 may extend to the shore where a person may rotate the shaft from its T handle attached to the end of the shaft. See FIG. 6. The shaft may be placed in a cradle such as shown in FIG. 6. The cradle allows the shaft to slide in and out and rotate freely. A power drive unit such as a hydraulic or electric motor 101 may be directly coupled to the keyed shaft 61 and mounted to a mount attached to brush frame 62. Flexible power lines such as hydraulic hoses or sealed electrical lines may be strapped to conduit J to reach the motor drive unit from a power source. The power drive unit 101 may also be mounted to a frame such as on system AA. In this case, a splined shaft would reach from the keyed brush shaft to the power drive motor. See FIG. 7.

The power drive motor 101 may be set up to operate the brush 60 continually or intermittently when the controls are manually operated by an operator. The power drive motor may also be made to operate at preset time intervals.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A rotary, self-cleaning drum strainer comprising:
   a) a frame;
   b) a drum, having an outer surface, rotatably mounted on said frame;
   c) a brush, rotatably attached to said frame, and being positioned such that said brush is in frictional contact with the outer surface of said drum;
   d) a means for rotating said brush, whereby when said means for rotating is operated, said drum is rotated by said brush, and only said brush; and
   e) a means for collecting debris from said brush as said brush is rotated.

2. The rotary, self-cleaning drum strainer of claim 1 further comprising: a means for clearing said means for collecting debris of collected debris.

3. The rotary, self-cleaning drum strainer of claim 1 where the means for rotating said brush is an electric motor.

4. The rotary, self-cleaning drum strainer of claim 1 wherein the means for collecting debris from said brush comprises a collecting bin, attached to said frame and being placed below said brush.

5. A rotary, self-cleaning drum strainer comprising:
   a) a drum, said drum having an outer surface and a frame, said frame having a pair of support brackets extending therefrom, said support brackets having a pair of bearing surfaces;
   b) a brush, said brush having a shaft;
   c) a means for securing said shaft of said brush to said pair of bearing surfaces such that when said shaft is, attached to said bearing surfaces of said pair of support brackets by said means for securing, said brush rests against the outer surface of said drum;
   d) a means for rotating said shaft;
   e) a collection bin, pivotably attached to said frame, and being placed below said brush; and
   f) a means for pivoting said collection bin to discharge accumulated debris therefrom.

6. The rotary, self-cleaning drum strainer of claim 5 wherein the means for rotating said shaft comprises an electric motor attached to said shaft, and a means for attaching said electric motor to said shaft.

7. The rotary, self-cleaning drum strainer of claim 5 wherein the means for rotating said shaft comprises:
   a) an extension shaft, operably attached to said shaft; and
   b) a handle, attached to said extension shaft, such that said shaft is rotated by hand.

8. The rotary, self-cleaning drum strainer of claim 5 wherein the means for pivoting said collection bin comprises:
   a) an extension shaft, extending outwardly from said collection bin said extension shaft further including a handle.

9. The rotary, self-cleaning drum strainer of claim 5 further comprising a means for holding said rotary, self-cleaning drum strainer at a particular depth in water.

10. The rotary, self-cleaning drum strainer of claim 9 wherein the means for holding said rotary, self-cleaning drum strainer at a particular depth includes at least one float.

11. The rotary, self-cleaning drum strainer of claim 9 wherein the means for holding said rotary, self-cleaning drum strainer at a particular depth includes a least one float, wherein said a least one float is located within said drum.

12. A rotary, self-cleaning drum strainer comprising:
   a) a drum, said drum having an outer surface and a frame, said frame having a pair of support brackets extending therefrom, said support brackets having a pair of bearing surfaces;
   b) a brush, said brush having a shaft;
   c) a means for securing said shaft of said brush to said pair of bearing surfaces such that when said shaft is, secured to said bearing surfaces of said pair of support brackets by said means for securing, said brush rests against the outer surface of said drum;
   d) a means for rotating said shaft;
   e) a collection bin, being placed below said brush;
   f) a means for pivoting said collection bin to discharge accumulated debris therefrom;
   g) a skid; having an upper framework;
   h) a boom, fixedly attached to said upper framework;
   i) a winch, fixedly attached to said upper framework, said winch having a cable;
   j) a boom pulley, secured to said boom, whereby said cable passes over said boom pulley and is attached to said means for lifting said drum.

13. The rotary, self-cleaning drum strainer of claim 12, wherein the means for rotating said shaft comprises an electric motor attached to said shaft.

14. The rotary, self-cleaning drum strainer of claim 12 wherein the means for rotating said shaft comprises:
   a) an extension shaft, operably attached to said shaft; and
   b) a handle, attached to said extension shaft, such that said shaft is rotated by hand.

15. The rotary, self-cleaning drum strainer of claim 12 wherein the means for pivoting said collection bin comprises:
   a) an extension shaft, extending outwardly from said collection bin, said extension shaft having a handle.

16. The rotary, self-cleaning drum strainer of claim 12 further comprising a means for holding said rotary, self-cleaning drum strainer at a particular depth in water.

17. The rotary, self-cleaning drum strainer of claim 16 wherein the means for holding said rotary, self-cleaning drum strainer at a particular depth includes at least one float.

18. The rotary, self-cleaning drum strainer of claim 16 wherein the means for holding said rotary, self-cleaning drum strainer at a particular depth includes at least one float, located within said drum.

* * * * *